United States Patent Office 3,079,369
Patented Feb. 26, 1963

3,079,369
POLYMERS OF HYDROXYALKYL VINYL-
BENZYL ETHERS
John G. Abramo, Springfield, Mass., assignor to Monsanto Chemical Company, St. Louis, Mo., a corporation of Delaware
No Drawing. Filed Mar. 25, 1960, Ser. No. 17,495
5 Claims. (Cl. 260—80.3)

The present invention is directed to synthetic polymers and more particularly to synthetic polymers containing available hydroxyl groups.

Homopolymers constituted of those vinylbenzyl ethers presently known, are unavailable for cross-linking or curing using comparatively mild conditions, i.e., compounding and partially reacting the ethers with agents such as the di-isocyanates, di-acid chlorides, acid anhydrides, etc., followed by application and exposure to elevated temperatures. This reflects that the ethers known to date are the alkyl vinylbenzyl ethers. Rather, to cross-link or cure polymers of alkyl vinylbenzyl ethers much more severe methods than that outlined above must be used, which can result in degradation of the polymers and their properties.

Accordingly, it is a principal object of this invention to provide synthetic polymeric materials constituted of vinylbenzyl ethers which are capable of being cross-linked or cured through a method designed to effect minimum degradation of the said polymeric materials.

Other objects of the invention will in part be obvious and will in part appear hereinafter.

These and other objects of the invention are attained in polymeric materials constituting in polymerized form hydroxyalkyl vinylbenzyl ethers having the structure:

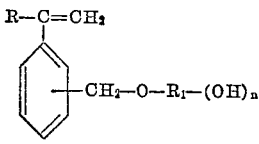

wherein R is selected from the class consisting of hydrogen and methyl radical, $R_1$ is selected from the class consisting of alkyl radicals and $n$ represents an integer of 1–2.

The following examples are given in illustration of the invention. Where parts are mentioned, parts by weight are intended unless otherwise described.

Example I

A tube 8 mm. in diameter containing 3 grams of beta-hydroxyethyl p-vinylbenzyl ether and 0.1 gram of ditertiarybutyl peroxide is flushed with nitrogen, sealed and heated in an oil bath set at 140° C. for 8 hours. The polymer product which is obtained upon opening the tube is a hard colorless solid which is soluble in hot dimethyl formamide.

Three grams of the polymer product is dissolved in 15 ml. of dimethyl formamide heated to 105° C. about 0.25 gram of toluene di-isocyanate is then mixed into the hot solution and a 3 mil film of the resulting solution is cast onto a 10 mil steel plate. The assembly is heated in a circulating-air oven set at 160° C. for three hours. The cured film which results is hard and glossy and is resistant to attack by solvents including xylene-butanol mixtures.

Example II

A solution of 10 grams of 4-hydroxybutyl p-vinylbenzyl ether, 25 grams of toluene, and 0.2 gram of ditertiary butylperoxide is sealed in 8 mm. tubing and heated at 140° C. for 4 hours. After removal from the tubing, the polymer product is precipitated from 250 ml. of methanol. The methanol is decanted from the polymer and an additional 200 ml. is poured over the polymer and heated for 1 hour at atmospheric reflux. The polymer is isolated by filtration and dried for 16 hours in a vacuum oven set at 40° C. Analysis of the polymer for hydroxyl content yields values consistent with the 8.3% theoretical value calculated for poly-4-hydroxybutyl p-vinylbenzyl ether.

Example III

The procedure described in Example II is repeated using 12 grams of 2,3-dihydroxypropyl p-vinylbenzyl ether in place of the 10 grams of 4-hydroxybutyl p-vinylbenzyl ether employed above. Analysis of the polymer for hydroxyl content yields values near the 16.3% theoretical value calculated for poly-2,3-dihydroxypropyl p-vinylbenzyl ether.

Example IV

Two grams of beta-(2-hydroxyethyloxy)ethyl p-isopropenylbenzyl ether and 0.1 gram of tertiarybutyl peroxide are sealed in 8 mm. tubing and heating at 120° C. for 20 hours. The polymer product which is then isolated has the correct elemental analysis expected for poly-beta-(2-hydroxyethoxy)ethyl isopropenylbenzyl ether.

Example V

Two grams of 2-hydroxyethyl vinylbenzyl ether, two grams of 4-hydroxybutyl vinylbenzyl ether and 0.1 gram of tertiary butyl peroxide are mixed and sealed in 8 mm. glass tubing. These are heated at 130° C. for 16 hours. The resulting polymer is analyzed elementally and yields values expected for a copolymerized product of the starting ethers.

The present invention is directed to polymers of hydroxyalkyl vinylbenzyl ethers having the structure:

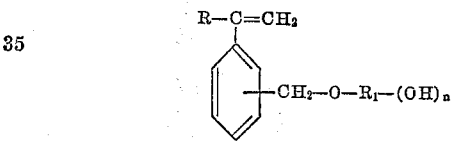

wherein R is selected from the class consisting of hydrogen and methyl radical, $R_1$ is an alkyl radical and $n$ represents an integer of 1–2. In their preferred form, the subject ethers are those in which the alkyl function symbolized by $R_1$ is saturated and can contain 2–10 carbon atoms. As the number of carbons increase, the polymer which results exhibits an increase in elastomeric or rubbery properties. The alkyl function can be straight chained or branched in nature. The hydroxyl function contained on the alkyl function ($R_1$) can be 1 and 2 in number as indicated by $n$ being equal to corresponding integers. The location of the hydroxyl groups on the said alkyl function can be anywhere on the chain, with the more narrow preference directed to locating the hydroxyl functions on the terminal ends of said alkyl function. Additionally, when two hydroxyl functions are included on the alkyl function each hydroxyl group should be attached to a different carbon of the said alkyl function. Representative of the subject ethers are the 2-hydroxyethyl o-vinylbenzyl ethers; 2-hydroxyethyl m-vinylbenzyl ethers; 2-hydroxyethyl p-vinylbenzyl ethers; 2-hydroxyethyl o-isopropenylbenzyl ethers; 2-hydroxyethyl m-isopropenylbenzyl ethers; 2-hydroxyethyl m-isopropenylbenzyl ethers; 3-hydroxypropyl o-vinylbenzyl ethers; 3-hydroxypropyl m-vinylbenzyl ethers; 3-hydroxypropyl p-vinylbenzyl ethers; 3-hydroxypropyl o-isopropenylbenzyl ethers; 3-hydroxypropyl m-isopropenylbenzyl ethers; 3-hydroxypropyl p-isopropenylbenzyl ethers; 2-hydroxypropyl o-vinylbenzyl ethers; 2-hydroxypropyl m-vinylbenzyl ethers; 2-hydroxypropyl p-vinylbenzyl ethers; 2-hydroxypropyl o-isopropenylbenzyl ethers; 2-hydroxypropyl m-isopropenylbenzyl ethers; 2-hydroxypropyl p-isopropenylbenzyl ethers; 2,3-dihydroxypropyl o-vinylbenzyl ethers;

2,3-dihydroxypropyl m-vinylbenzyl ethers; 2,3-dihydroxypropyl p-vinylbenzyl ethers; 2,3-dihydroxypropyl o-isopropenylbenzyl ethers; 2,3-dihydroxypropyl m-isopropenylbenzyl ethers; 2,3-dihydroxypropyl p-isopropenylbenzyl ethers; 4-hydroxybutyl o-vinylbenzyl ethers; 4-hydroxybutyl m-vinylbenzyl ethers; 4-hydroxybutyl p-vinylbenzyl ethers; 4-hydroxybutyl o-isopropenylbenzyl ethers; 4-hydroxybutyl m-isopropenylbenzyl ethers; 4-hydroxybutyl p-isopropenylbenzyl ethers; 3,4-dihydroxybutyl o-vinylbenzyl ethers; 3,4-dihydroxybutyl m-vinylbenzyl ethers; 3,4-dihydroxybutyl p-vinylbenzyl ethers; 3,4-dihydroxybutyl o-isopropenylbenzyl ethers; 3,4-dihydroxybutyl m-isopropenylbenzyl ethers; 3,4-dihydroxybutyl p-isopropenylbenzyl ethers; 3,4-dihydroxy-2-butyl o-vinylbenzyl ethers; 3,4-dihydroxy-2-butyl m-vinylbenzyl ethers; 3,4-dihydroxy-2-butyl p-vinylbenzyl ethers; 3,4-dihydroxy-2-butyl o-isopropenylbenzyl ethers; 3,4-dihydroxy-2-butyl m-isopropenylbenzyl ethers; 3,4-dihydroxy-2-butyl p-isopropenylbenzyl ethers; etc. Also intended are those ethers such as are represented by beta-(2-hydroxyethoxy)ethyl p-vinylbenzyl ethers, beta-(2-hydroxyethoxy)ethyl m-vinylbenzyl ethers, beta-(2-hydroxyethoxy)ethyl p-vinylbenzyl ethers, beta-(2-hydroxyethoxy)ethyl o-isopropenylbenzyl ethers, beta-(2-hydroxyethoxy)ethyl m-isopropenylbenzyl ethers, beta-(2-hydroxyethoxy)ethyl p-isopropenylbenzyl ethers, etc.

The copolymers of the present invention can be prepared using mass, solution, or emulsion polymerization.

In the mass and solution polymerization, the ethers in monomeric form are subjected to heating at about 50 to 200° C. under at least autogenous pressure until they become polymerized. Copolymerization can be thermally initiated, but it is preferred to employ a small quantity of a free radical polymerization initiator such as hydrogen peroxide, ditertiary butyl peroxide, benzoyl peroxide, tertiary butyl perbenzoate, pinacolone peroxide, ditertiary-butyl hydroperoxide, azo-bis-isobutyronitrile, etc. The amount of such initiator employed will generally fall within the range of about 0.05 to 5.0 parts by weight per 100 parts of total monomers. This may, however, be varied.

The solvents suitable for use in the solution-type of polymerization are organic liquids which are inert to the reaction, e.g., toluene, xylene, benzene, dioxane, etc.

In the emulsion polymerization, a monomeric mixture prepared as above, is continuously and slowly added to an excess of water maintained at a polymerization temperature of 30 to 120° C. and autogenous pressure. An emulsifying agent and a polymerization catalyst are necessary in carrying out this type of polymerization. Either or both can be initially present in the water in whole or in part, or added as an aqueous solution together with the monomeric mixtures. The amount of water to be used can be varied within wide limits. It is generally preferable, however, to use from about 100–300 parts of water per 100 parts of monomeric mixture in order to obtain aqueous copolymer latices constituting from 25–50% solids by weight.

The identity of the emulsifying agents can be varied. They can be nonionic, anionic or cationic. Those which operate satisfactorily either alone or in mixtures thereof include salts of high molecular weight fatty acids, quaternary ammonium salts, alkali metal salts of rosin acids, alkali metal salts of long-chain sulfates and sulfonates, ethylene oxide condensates of long-chain fatty acids, alcohols or mercaptans, sodium salts of sulfonated hydrocarbons, aralkyl sulfonates, etc. Representative of emulsifiers which can be used are sodium laurate, triethanolamine, sodium lauryl sulfate, 2-ethylhexyl esters of sulfosuccinic acid, sodium salt of dioctyl sulfosuccinic acid, etc. Generally from about 0.1–5.0 parts by weight of emulsifier per 100 parts of total monomer operates quite satisfactorily.

Polymerization initiators or catalysts suitable for use in the emulsion-type polymerizations designed to produce the copolymers of the present invention include free radical initiators such as potassium persulfate, cumene hydroperoxide, ammonium persulfate as well as various of the redox-type catalyst systems represented by combinations of any of hydrogen peroxide, potassium persulfate, cumene hydroperoxide, tertiarybutylisopropyl benzene hydroperoxide, diisopropylbenzene hydroperoxide, etc. with any of potassium ferricyanide, dihydroxyacetone, sodium formaldehyde sulfoxylate, triethanolamine, glucose, fructose, etc. The amount of initiator utilized conveniently can range from about 0.05–5.0 parts by weight per 100 parts by weight of total monomer.

The synthetic polymers of the present invention are clear and substantially devoid of color, they can be used as linear copolymers, in the form obtained from any of the mass, solution or emulsion processes described above to provide a variety of coating and finishing applications. As indicated earlier, increase in the number of carbon atoms of the alkyl radical ($R_1$) of the ethers is paralleled by increase in the elastomeric or rubbery properties of the resulting polymer. Polymers constituted of the subject ethers, the alkyl radicals ($R_1$) of which contain greater than about 5 carbons are distinctly rubbery or elastomeric in nature. Because they are soluble in a variety of common organic solvents such as methanol, xylene, etc., the polymers of the present invention can be solvated and applied as such to the surfaces on which they are to provide protective coatings or finishes. Of greater interest, however, and due to the presence of available hydroxyl groups on the backbone of the copolymers of the present invention, the featured polymers, while in linear form, can be compounded with other resinous materials such as melamine-formaldehyde and urea-formaldehyde condensates, alkyd resins as well as other curing agents such as di-isocyanates di-acid chlorides, etc. Then after being so compounded and partially advanced they can be solvated in organic solvents such as xylene, dimethylformamide, etc., and in this form conveniently deposited on surfaces and substrates which they are designed to provide with a protective coating or finish. They can then be exposed to elevated temperatures of 100 to 250° C. causing them to become cured or cross-linked with the previously available hydroxyl groups acting as sites for this secondary reaction. In the cross-linked form which then results, the polymers of the present invention retain their cohesive properties, form continuous films, coatings or finishes reflecting that they have suffered little or no degradation as a result, while nonetheless evidencing advanced resistance to the usual organic solvents, and other benefits otherwise obtained in cross-linked or cured polymers.

The polymers of the present invention can also be compounded with various fillers and adjuncts such as colorants, plasticizers, etc.

It will thus be seen that the objects set forth above among those made apparent from the preceding description are efficiently attained and since certain changes can be made in carrying out the above process and in the polymer products which result without departing from the scope of the invention, it is intended that all matter contained in the above description shall be interpreted as illustrative and not in a limiting sense.

What is claimed is:

1. Synthetic polymers of monomers consisting of hydroxyalkyl vinylbenzyl ethers having the structure:

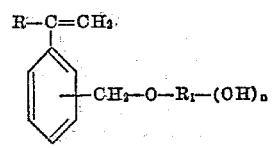

wherein R is selected from the class consisting of hydrogen and methyl radical, $R_1$ is selected from the class consisting of alkyl radicals containing 2–10 carbon atoms and $n$ represents an integer of 1–2.

2. A synthetic polymer according to claim 1 wherein the hydroxyalyl vinylbenzyl ether is a mixture of 2-hydroxyethyl vinylbenzyl ether and 4-hydroxybutyl vinylbenzyl ether.

3. A synthetic polymer of monomer consisting of beta-hydroxyethyl p-vinylbenzyl ether.

4. A synthetic polymer of monomer consisting of 4-hydroxybutyl p-vinylbenzyl ether.

5. A synthetic polymer of monomer consisting of 2,3-dihydroxypropyl p-vinylbenzyl ether.

References Cited in the file of this patent

UNITED STATES PATENTS 2,825,719     Herrie ------------------ Mar. 4, 1958